United States Patent

Obara et al.

[11] Patent Number: 5,920,161
[45] Date of Patent: Jul. 6, 1999

[54] DRIVING SYSTEM FOR PERMANENT MAGNET TYPE SYNCHRONOUS MACHINE SUITABLE FOR ELECTRIC VEHICLE AND DRIVING CONTROL METHOD USING THE SAME

[75] Inventors: Sanshiro Obara, Tokai-mura; Kazuyoshi Sasazawa, Hitachinaka; Nobunori Matsudaira, Hitachi, all of Japan

[73] Assignee: Hitachi, Ltd., Japan

[21] Appl. No.: 09/083,978

[22] Filed: May 26, 1998

[30] Foreign Application Priority Data

May 26, 1997 [JP] Japan ................................ 9-134550

[51] Int. Cl.$^6$ ...................................... B60L 11/02
[52] U.S. Cl. .......................... 318/139; 318/151; 318/720; 180/65.4; 290/14
[58] Field of Search ...................... 318/139, 140, 318/141, 147, 151, 152, 700, 716–724; 180/65.1–65.4; 290/7, 8, 9, 14, 45

[56] References Cited

U.S. PATENT DOCUMENTS 5,428,274 6/1995 Furutani et al. ................... 318/139

5,789,881 8/1998 Egami et al. ...................... 318/139

*Primary Examiner*—Bentsu Ro
*Attorney, Agent, or Firm*—Evenson, McKeown, Edwards & Lenahan, P.L.L.C.

[57] ABSTRACT

In a driving system comprising a permanent magnet type synchronous machine, an electric power converter for the synchronous machine and a driving controller for driving the electric power converter, the driving controller comprises a current command generator for generating a d-axis current command and a q-axis current command of the synchronous machine, a d, q-axis current control uni for generating AC voltage command values Vu*, Vv* and Vw* based on the d-, q-axis currents from the synchronous machines, and a PWM control unit for generating driving signals for the electric power converter based on the AC voltage command values. A phase generator generates a phase signal from zero-cross point information of the AC voltage command values and a phase difference angle δ between induced voltage and terminal voltage of the synchronous machine; and a magnet temperature compensating unit generates a phase signal from zero-cross point information of the AC voltage command values and a phase difference angle δ of a δ-table storing phase difference angles δ between induced voltage and terminal voltage of the synchronous machine. The phase difference angle δ is compensated based on a magnet temperature.

12 Claims, 10 Drawing Sheets

E010, V110 : AT LOW MAGNET TEMPERATURE

FIG.5

E011, V111 : AT HIGH MAGNET TEMPERATURE

FIG.6

MAGNET TEMPERATURE (°C)

DRIVING SYSTEM FOR PERMANENT MAGNET TYPE SYNCHRONOUS MACHINE SUITABLE FOR ELECTRIC VEHICLE AND DRIVING CONTROL METHOD USING THE SAME

BACKGROUND OF THE INVENTION

The present invention relates to a driving system for a synchronous machine, and particularly, relates to a driving system suitable for an electric vehicle having a permanent magnet type synchronous machine.

In general, a hybrid driving system for an electric vehicle is composed of a generator driven by an engine, a battery, a motor for driving the vehicle by using the generator or the battery as the electric power source and respective driving circuits for the generator and the motor, in which the respective driving circuits have their own electric power converters. Two methods of driving a vehicle are known. One is a services type in which the engine, the generator and the motor are linked in series, and the other is a parallel type in which the engine, the generator and the motor are linked in parallel. In the series type, the vehicle is always driven by the motor. The electric power for driving the motor is supplied from the battery or the generator linked to the engine, and at the same time the battery is charged by the generator linked to the engine.

The prior art of the hybrid driving systems of this kind is disclosed, for example, in Japanese Patent Application Laid-Open No. 7-336809. The prior art is a series type hybrid driving system in which output power of the generator driven by the engine is supplied to charge the battery using a diode rectifying circuit.

On the other hand, irrespectively of whether the motor is an induction motor or a synchronous motor using permanent magnets, a vector control system is practically applied for driving the AC motor of the electric vehicle, whereby current of the motor is separated into a torque current Iq and an exciting current Id. In a system disclosed in Japanese Patent Application Laid-Open No. 7-212915, only a q-axis current command Iq* is compensated based on a voltage and a current of the motor and a signal of a temperature sensor in order to compensate variation of output power caused by temperature rise of the magnets of the permanent magnet synchronous motor.

The output power or the torque of the permanent magnet type synchronous motor is decreased by a decrease of the induced o voltage caused by temperature rise of the magnets. Characteristic of the output power decrease caused by the temperature rise of the magnets of the permanent magnet type synchronous motor differs depending on a material of the magnets. For example, the characteristic of output power decrease for a ferrite magnet is approximately $-0.2\%/^\circ$ C., and that for a neodymium magnet is $-0.1\%/^\circ$ C. Particularly in a compact-sized synchronous machine which is sensitive to temperature rise of the permanent magnets due to its small size the magnitude of decrease in the output power or the torque caused by the temperature rise is substantially large.

SUMMARY OF THE INVENTION

An object of the present invention is to provide a driving system which can compensate variation of the output power caused by the temperature rise in the magnets of a permanent magnet type synchronous machine, and particularly, a driving system for a permanent magnet type synchronous machine suitable for a controller of an electric vehicle which can compensate variation of the output power caused by the temperature rise in the magnets of the permanent magnet type synchronous machine for charging a battery of the electric vehicle.

The object of the present invention is accomplished by providing a driving system for a permanent magnet type synchronous machine comprising a synchronous motor for driving a vehicle using a permanent magnet type generator or a battery as a main electric power source; and a driving controller for the synchronous machines, wherein the driving controller is composed of a current command generating unit for generating a d-axis current command and a q-axis current command of the synchronous machines; a d, q-axis current control unit for generating AC voltage command values Vu*, Vv* and Vw* based on the d, q-axis current commands and detected values of d, q-axis current commands and detected values of d, q-axis currents from the synchronous machines; and a PWM control unit for generating driving signals for the electric power converter based on the AC voltage command values, and the same which further comprises: a phase generating unit for generating a phase signal from zero-cross point information of the AC voltage command value and a phase difference angle δ between the induced voltage and the terminal voltage of the synchronous machine; and a magnet temperature compensating means for compensating the phase different angle δ depending on magnet temperature rise of the permanent magnet type synchronous machines.

Further, for example, an estimated phase difference angle δ compensating table is provided as the phase difference angle δ compensating means. The estimated phase difference angle δ compensating table receives an output command of the synchronous machine and a magnet temperature of the synchronous machine as input signals, and outputs a compensating coefficient Kδ for δ.

Another feature of the present invention is in that in addition to the phase difference angle δ, current commands Id* and Iq* for the d, q-axis currents are also compensated based on the magnet temperature.

As a means for compensating the current commands Id* and Iq* for the d, q-axis currents an Id compensating table and an Iq compensating table are provided. The Id compensating table and the Iq compensating table receive an output command and a magnet temperature as input signals, and output compensating coefficients.

Still another feature of the present invention is that the magnet temperature compensating means comprises a magnet temperature estimating means for estimating a magnet temperature from a core temperature. As the magnet temperature estimating means, a data table for estimating the magnet temperature is employed. As the magnet temperature estimating means, a first-order time lag element assuming a thermal time constant may be employed.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

An embodiment of the present invention will be described below by way of example of a hybrid driving system using a permanent magnet synchronous machine, referring to the accompanying drawings. Therein, the description will be made mainly on a sensorless controlled generator without using any rotation sensor as the synchronous machine. The sensorless control is suitable for use in a high temperature environment inside an engine compartment of a vehicle and for improvement of space factor therein.

Figure 1:
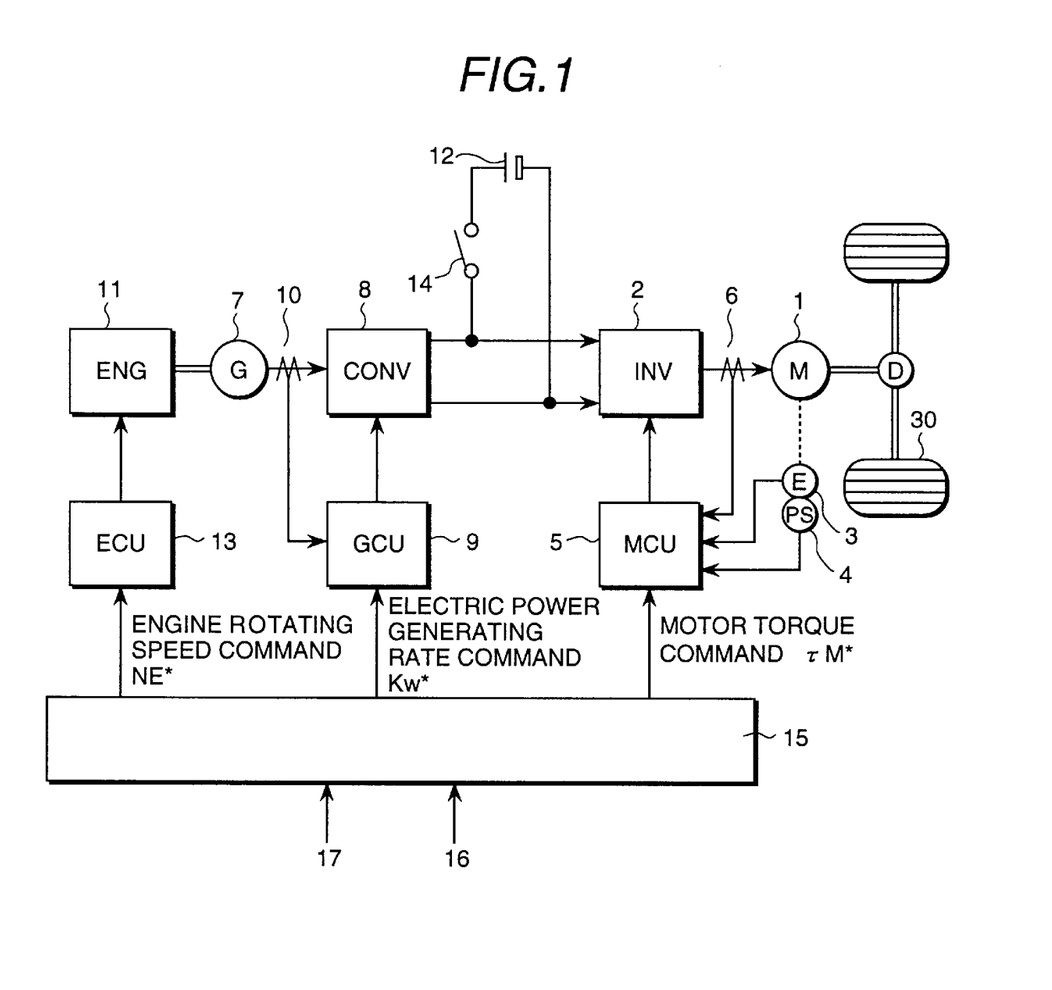
FIG. 1 is a structural block diagram showing an embodiment of a driving system for an electric vehicle having a sensorless-controlled electric power generation system in accordance with the present invention.

FIG. 1 shows the structure of a hybrid driving system for an electric vehicle to which an embodiment of the present invention is applied. A motor 1 is a permanent magnet type synchronous motor, and an inverse converter, that is, an inverter 2 is used as an electric power converter. To the permanent magnet type synchronous motor 1, an encoder 3 as its rotating angle sensor and a magnetic pole position detector 4 for detecting its pole position are directly connected. A motor control unit (MCU) 5 generates PWM signals based on outputs of the encoder 3, the magnetic pole position detector 4 and an output of a current det3ector 6, to control the inverter 2.

An electric power generator 7 is a permanent magnet type synchronous generator, and uses a converter 8 for its power conversion. A generator control unit (GCU) 9 generates PWM signals based on an output of a current detector 10, and controls the converter 8. The generator control unit 9 performs sensorless control of the permanent magnet type synchronous generator 7 without using any rotation sensor.

In the hybrid driving system of FIG. 1, the electric vehicle is always driven by the permanent magnet type synchronous motor 1, and electric power of the motor 1 is obtained from a battery 12 or the permanent magnet type synchronous generator 7 driven by a gasoline engine 11. The battery 12 is also charged by the permanent magnet type synchronous generator 7. The engine 11 is controlled by an engine control unit (ECU) 13. The reference character 14 indicates a contactor, and the reference character 30 indicates a wheel.

A driving system control unit 15 transmits a motor torque command τ M* to the motor control unit 5, and controls the motor 1 so as to generate a torque corresponding to a control input through an acceleration pedal 16 or a brake pedal 17. Further, the driving system control unit 15 transmits an electric power generating command KW* and an engine rotating speed command NE* to the generator control unit 9 and to the engine control unit 13, respectively, to control an electric power generation of the generator 7 and an engine rotating speed of the engine 11 so that a required quantity of electric power is supplied to the battery 12 or the motor 1. When the control input through the acceleration pedal 16 is increased or decreased or kept constant, the driving system control unit 15 operates the motor 1 in a power running mode and charges the battery 12 to improve the acceleration capability of the vehicle.

Each of the inverter 2 and the converter 8 is composed of six power elements (IGBT) and diodes respectively connected to the power elements in parallel, and has a three-phase bridge circuit for controlling currents flowing through phases U, V, W of each of the motor 1 or the generator 7 and one smoothing capacitor. However, since the capacity of the inverter 2 is several times as large as the capacity of the converter 8, the capacities of respective elements composing their main circuits are different from each other.

The motor control unit 5 generates PWM signals to drive the power elements of the inverter 2 based on detected values of the current detector 6, the magnetic pole position detector 4 and the encoder 3, and the torque command value τ M* transmitted from a torque command generator 18.

Figure 2:
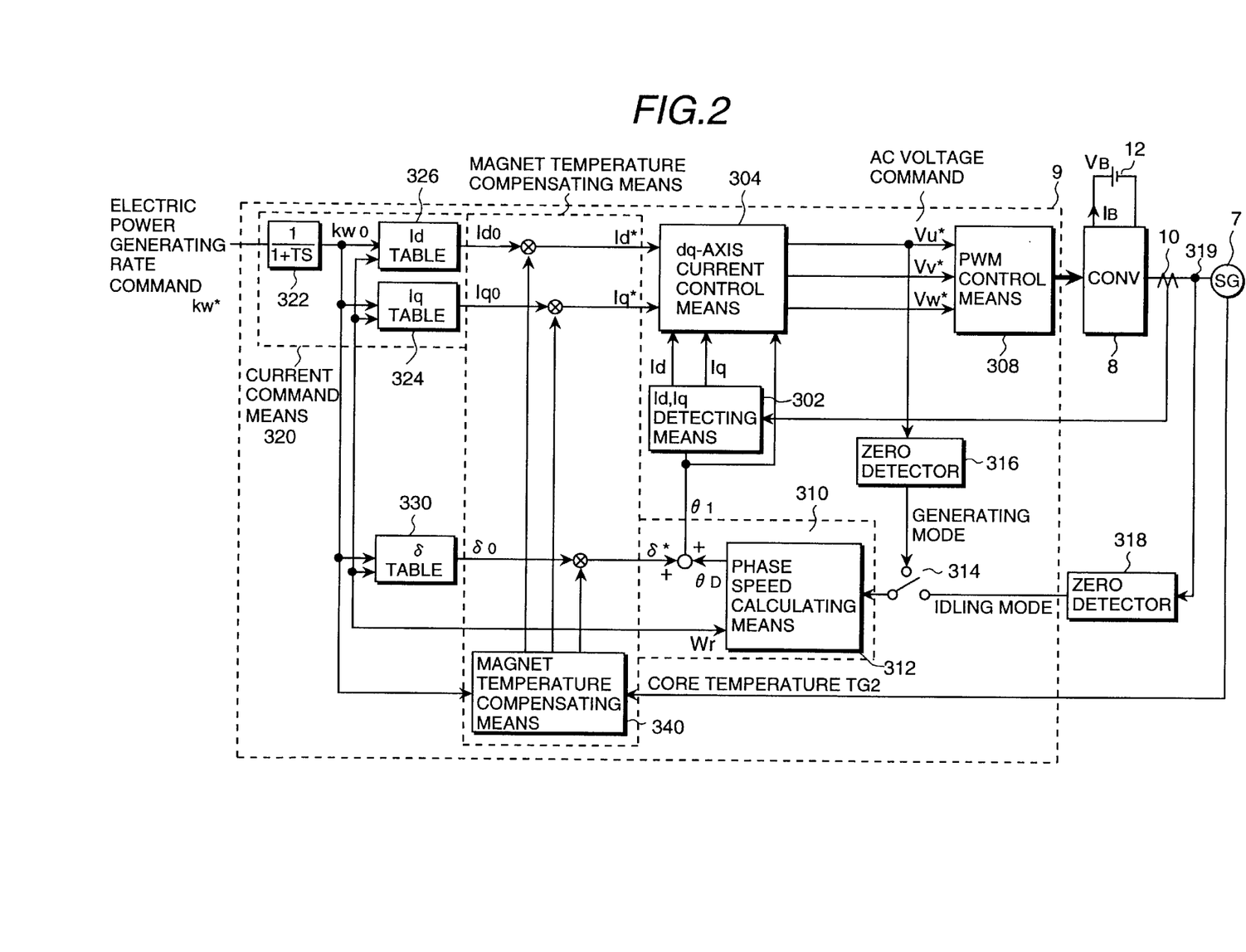
FIG. 2 is a detailed block diagram showing the function of the generator control unit in the electric power generation system of FIG. 1.

FIG. 2 is a block diagram showing the construction of an embodiment of the generator control unit 9. The generator control unit 9 comprises an Id Iq detector 302, a dq-axis current control unit 304, a PWM control unit 308, a phase generating unit 310, a current command unit 320, a magnetic pole position detecting unit 330 containing a δ table, and a magnet temperature compensating unit 340 for compensating a phase difference angle δ corresponding to a magnet temperature.

An input to a phase speed calculating unit 312 of the phase generating unit 310 is switched so as to be selectively connected to a zero detector 316 or 318 through a mode switching means 314 for switching between an idling mode and a generating mode. In the generating mode, the zero detector 316 detects a zero-cross point of the AC voltage command value Vu* which is an output of the dq-axis current control unit 304. On the other hand, in the idling mode, the zero detector 318 detects a zero-cross point of the induced voltage of the generator obtained from an output terminal 319 of the generator 7.

The current command unit 320 has an Iq table 324 and an Id table 326, and calculates current command positions Iq* and Id* based on the electric power generating command KW* and a generator rotating speed NG calculated in the phase speed calculating unit 312.

Figure 3:
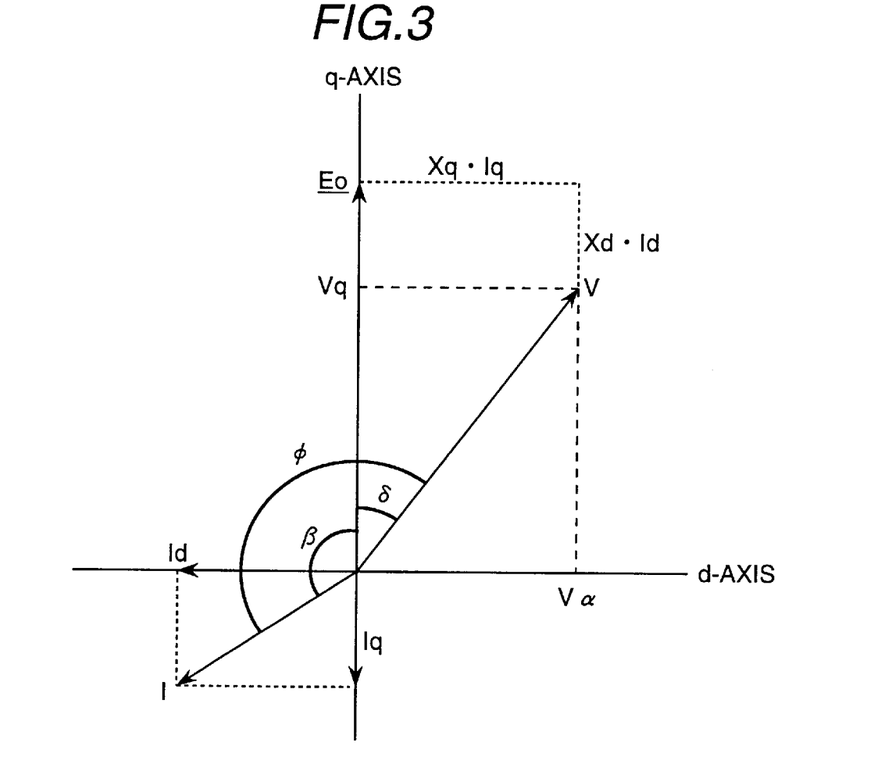
FIG. 3 is a basic vector diagram showing the generator controlling operation.

FIG. 3 shows a vector diagram of the synchronous machine in a generating operation. Here, the character I indicates a generated current, the character V indicates a terminal voltage, and the character E0 indicates an induced voltage of the synchronous generator 1.

Let a phase difference angle between the induced voltage E0 and the terminal voltage V be δ, a power factor angle between the current I and the terminal voltage V be φ, and an advanced angle between the induced voltage E0 and the phase current I be β.

When a target output, a target rotating speed and a target terminal voltage V of the synchronous generator are determined, a vector diagram shown in FIG. 3 is uniquely determined from the characteristics of the synchronous generator 1. Accordingly, the advanced angle β or the phase difference angle δ at that time can be uniquely determined. Therefore, in the synchronous generator driving system of the present invention without using any sensor, a phase signal may be obtained by detection of a zero-cross point of Vu* which is enabled by predictive controlling of the phase difference angle δ as indicated in the vector diagram of FIG. 3.

It is preferable that the synchronous generator 7 is operated at its maximum efficiency. Therefore, in general, the terminal voltage V generating the maximum efficiency at each operation point is selected, and the advanced angle β and the phase difference angle δ in that state are provided in a table to determine a magnetic pole position phase using the δ-table. The reason why the table is used is that the calculation time is shortened.

The current command unit 320 generates a torque command τ G*=k X KW*/ωr based on the electric power generation command KW* and the rotating speed NG of the generator calculated in the phase speed calculating unit 312, where the coefficient k is a constant.

In the current command unit 320, a q-axis current command value Iq* corresponding to a torque current portion is calculated in the Iq table 324 based on the torque command value τ G* and the rotating speed ωr of the generator. Further, a d-axis current command value Id* is also calculated through the Id table 326 based on the torque command value τ G* and the rotating speed ωr of the generator. As described above, the Iq table 324 and the Id table 326 of the current command unit 320 calculate the current command values Iq* and Id* necessary for high efficiency control based on the rotating speed ωr.

The rotating speed or of the generator 7 is obtained through the following calculation processing using the rotation sensor. Initially, when the shift switch is in the idling mode and the engine is at an idling rotating speed and the converter 8 is in the stop state of operation, calculation of phase θ0 and calculation of speed ωr are performed from a cycle of zero point of an induced voltage having a sinusoidal waveform not subjected to PWM control and obtained from the output terminal 319 of the generator 7. When the engine is at a rotating speed higher than the idling rotating speed, the phase generating unit 310 performs calculation of the phase based on a zero-cross point of the AC voltage command Vu* by switching the shift switch to the generating mode.

As described above, as a current control method of the generator, a phase signal θ1 to be used in the current control processing is formed using a zero-cross point signal of the AC voltage command Vu*, which is used as an internal data of DC components for the d, q-axis current control unit. Here, the calculation method of the phase signal θ1 will be described.

Figure 7:
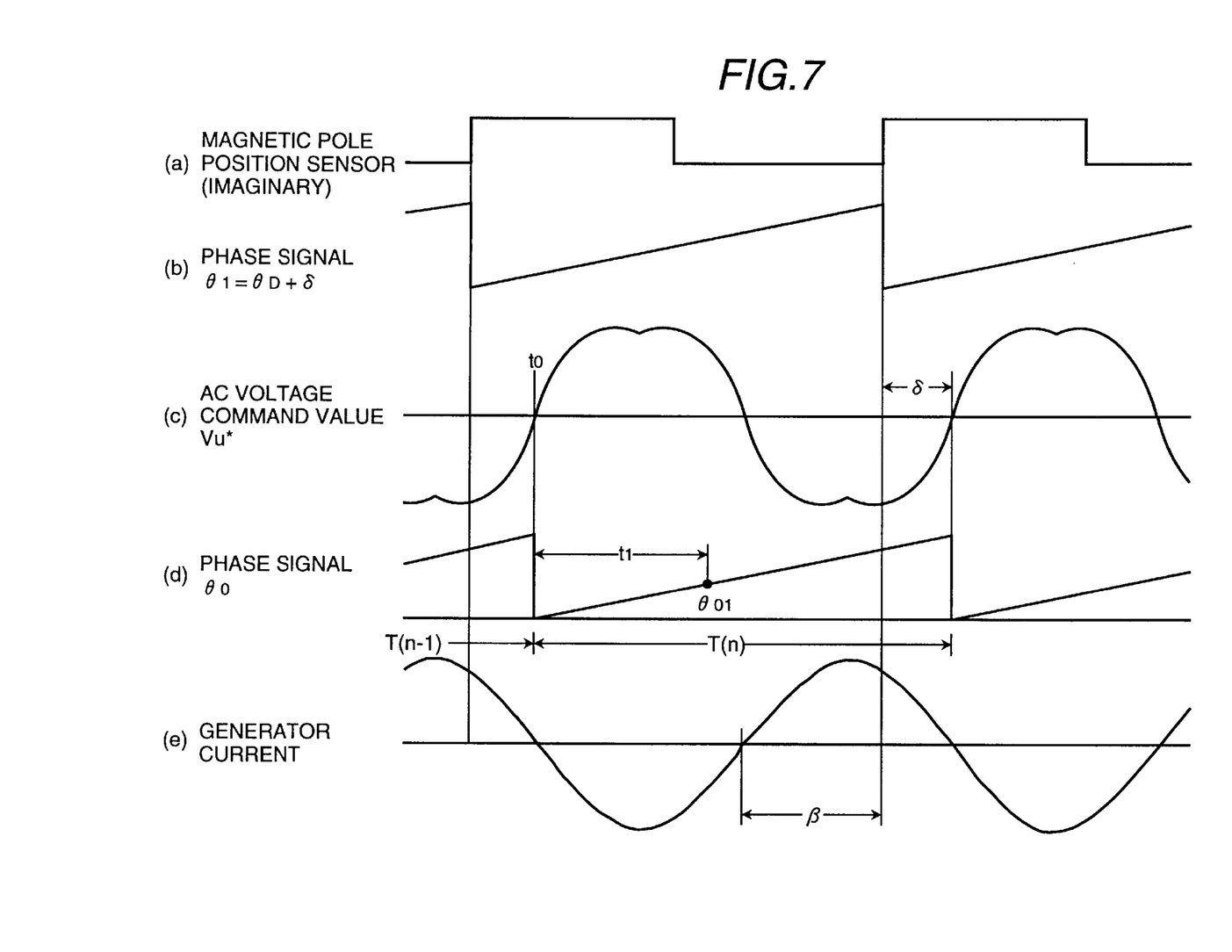
FIG. 7 is a time chart of the signals explaining operation of the electric power generator control unit of FIG. 2.

FIG. 7 shows a time chart of the signals for explaining operation f the electric power generator control 9. A rotating speed ωr is calculated from time t0 at a zero-cross point of the AC voltage command Vu* and its frequency T(n), and a phase signal θ01 is calculated from the rotating speed ωr and time information t1 in the phase speed calculating means 312. Their calculation equations are shown in Equation 1 as follows.

$$\theta 01 = \omega r1 \cdot t1$$

t1: time information
θ01: angle information $$\omega r1 = k/\{T(n-1)\}$$

$$\theta 1 = \theta 0 + \delta \tag{1}$$

Therein, the time information t1 is obtained from a timer in a microcomputer. The phase difference angle δ is a predicted value, and is calculated for every operating point in advance.

The generator control unit 9 detects the zero-cross point t0 of the AC voltage command value Vu* shown in FIG. 7(c) by the zero detecting unit 316. The phase calculating unit 310 calculates the phase signal θ0 shown in FIG. 7(d) at the zero-cross point t0, and the phase speed calculating unit 312 calculates the phase signal θ1 (=θ0+δ) delayed by a phase difference angle δ of the δ-table as shown in FIG. 7(b) to the imaginary magnetic pole position signal PS-U (FIG. 7(a)). Based on the phase signal θ1, the d-axis current control system of FIG. 2 performs the generator control operation by controlling the generator current iu to a current (FIG. 7(e)) advanced by the advanced angle β (β=ATAN(Id/Iq)) to the imaginary signal PS-U.

The above-mentioned zero-cross point is generally obtained using a microcomputer. In general, the voltage command signal is discrete information because it is calculated at every control sampling, but can be comparatively easily detected.

The Id Iq detecting unit 302 calculates the d, q-axis currents Id and Iq through coordinate transformation of 3-phase/2-phase using the phase signal θ1 based on three-phase AC of the generator current.

Based on these detected values and the command values Iq* and Id*, the Id Iq current control unit 304 calculates the voltage command values Vq* and Vd* through proportional or proportional and integrating compensation processing. Further, the Id Iq current control unit 304 calculates three-phase AC voltage command values Vu*, Vv*, Vw* through coordinate transformation of 3-phase/2-phase using the phase signal θ1.

The PWM control unit 308 generates PWM signals of the converter 8 by performing comparison processing of the voltage command values Vu*, Vv*, Vw* with a carrier wave signal of triangular wave signal to drive the converter 8. As described above, the generator current is controlled in response to the current command values Iq* and Id* by applying the PWM controlled voltage to the generator.

Figure 4:
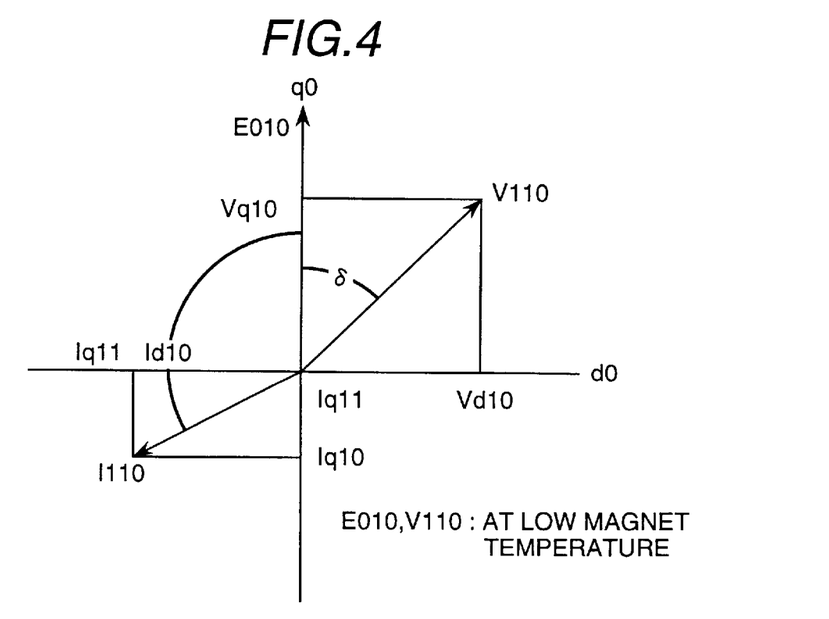
FIG. 4 is a vector diagram showing the electric power generation controlling operation at a low magnet temperature.
Figure 5:
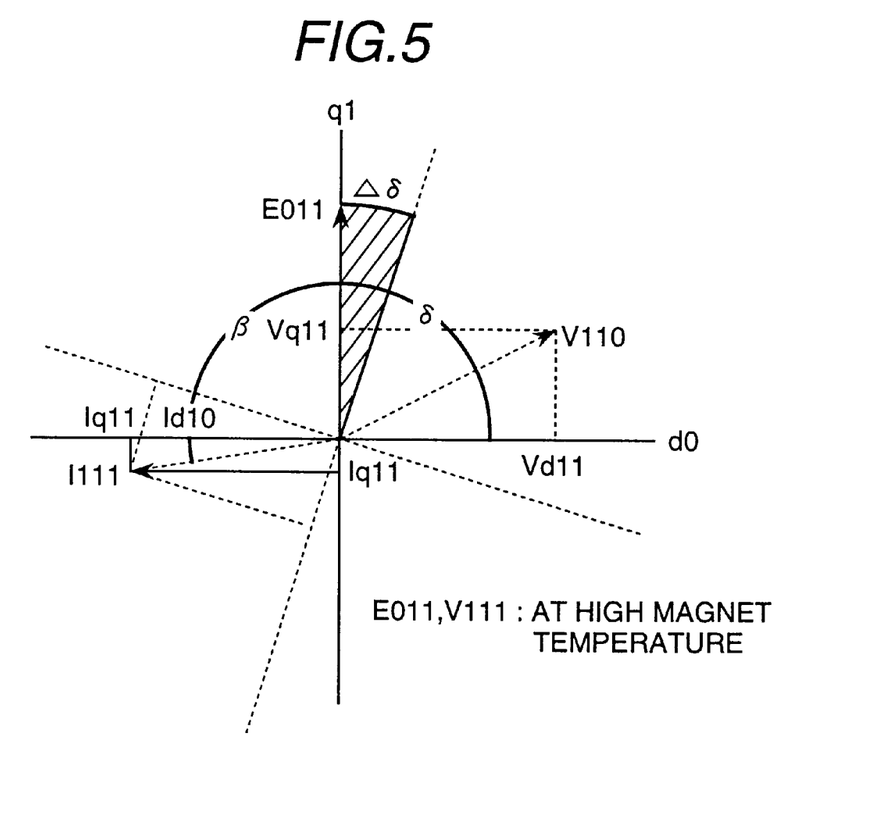
FIG. 5 is a vector diagram showing the electric power generation controlling operation at a high magnet temperature.
Figure 6:
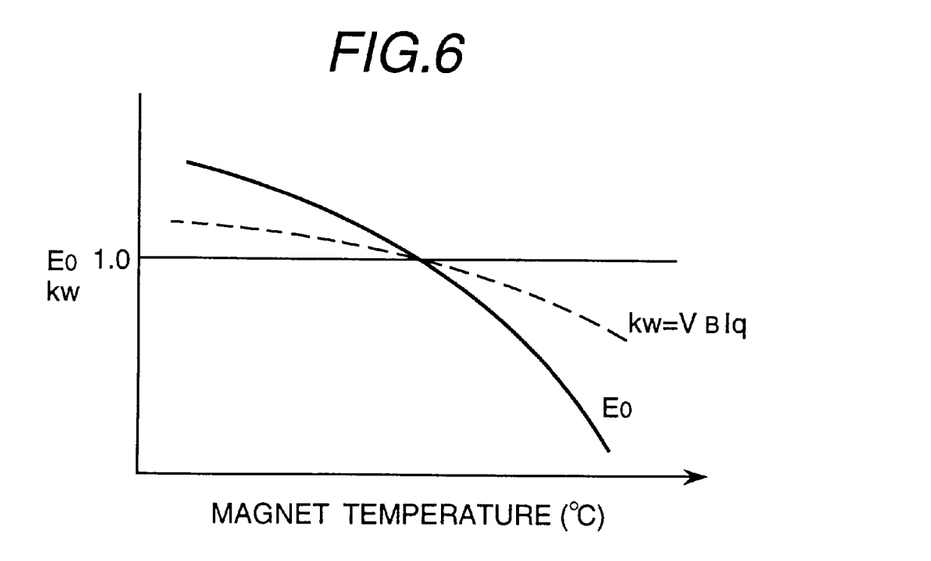
FIG. 6 is a graph showing decreasing characteristics of induced voltage and electric power generation output to magnet temperature.

Operation of temperature compensating control of the sensorless controlled generator will be described below. FIG. 6 shows a relationship between induced voltage E0 and characteristic of electric power generation output KW versus magnet temperature. It can be understood that the induced voltage is decreased and the electric power generation output is also decreased as the magnet temperature increases. FIG. 4 is a vector diagram showing the electric power generation controlling operation at a low magnet temperature, and FIG. 5 is a vector diagram showing the electric power generation controlling operation at a high magnet temperature. In the vector diagram of FIG. 4, when the resistance component is ignored, the basic equations of voltage and current of the generator become as follows based on FIG. 3.

$$Vq = E0 + Xd \cdot Id \quad (2)$$

$$Vd = Xq \cdot Iq \quad (3)$$

where Xd, Xq are d, q-axis impedances, respectively.

$$V1 = \{Vd^2\}^{1/2}, I1 = \{Id^2 + Iq^2\}^{1/2}$$

$$\delta = \tan^{-1}(Vd/Vq)$$

$$\beta = 180 = \tan^{-1}(Id/Iq), (\beta > 90°)$$

generator shaft torque $\tau_G = k\{E0 + (-1)LdId\}Iq$ (4)

where =Lq/Ld, and Lq, Ld are d, q-axis reactances, respectively.

Description will be made below on a method of compensating the phase difference angle δ in accordance with the present invention corresponding to the magnet temperature by magnet temperature compensation control in the sensorless control without using any rotation sensor (magnet pole position sensor and angle sensor).

Referring to FIG. 5, Vq in the equation (1) is decreased from Vq10 (FIG. 4) to vq11 by decreasing of the induced voltage from E010 (FIG. 4) to E011 due to increase of the magnet temperature. Therefore, the internal phase difference angle of the generator is increased, exceeding the predicted value δ by Δδ, and the internal Iq of the generator is decreased from Iq10 (FIG. 4) to Iq11 to reduce the output power. The phase shift Δδ of d, q-axes in the microcomputer due to the temperature rise should be compensated.

Figure 8:
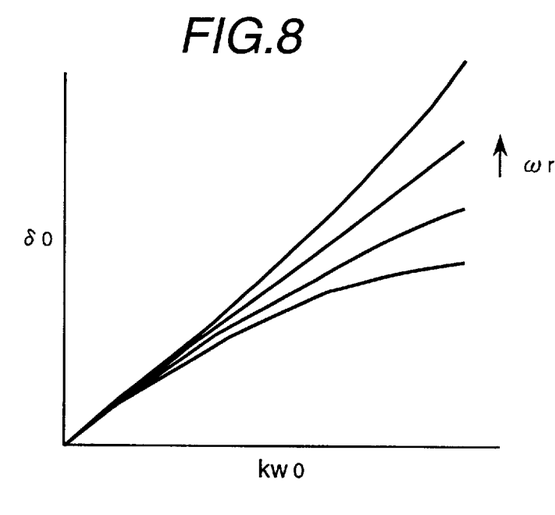
FIG. 8 is a graph showing the data for the estimated phase different angles δ in the δ table of FIG. 2.
Figure 9:
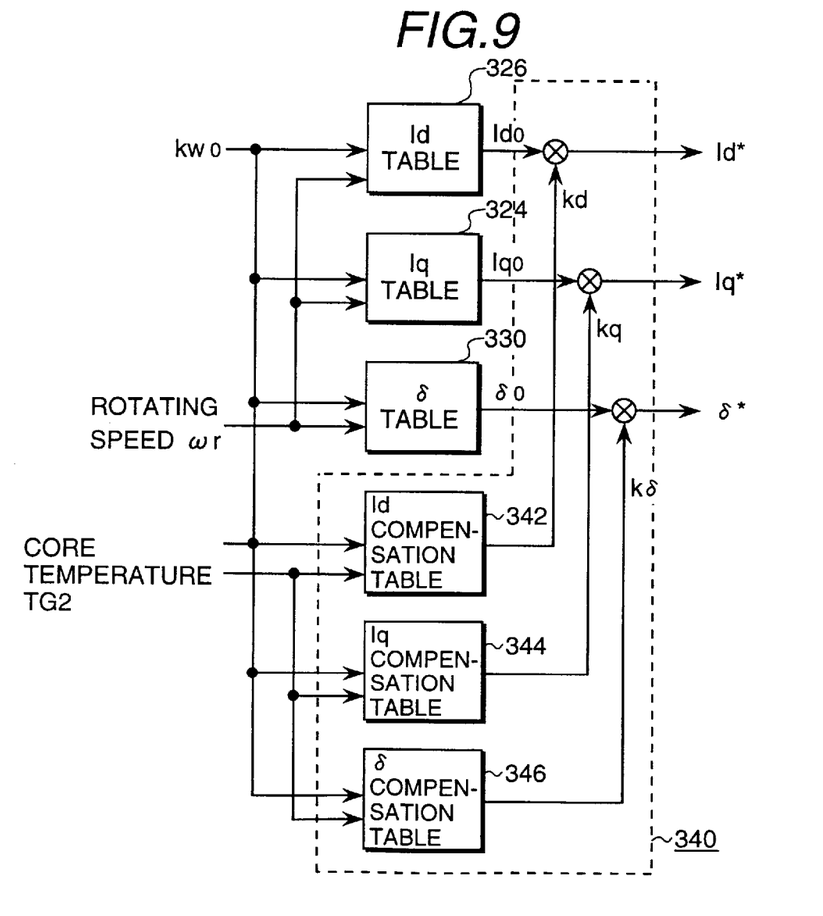
FIG. 9 is a detailed control block diagram of the magnet temperature compensation control means shown in FIG. 2.

An example in which the magnet temperature is estimated from a core temperature TG2 will be described first. Therefore, a magnet temperature compensating unit 340 shown in FIG. 9 is used for the compensation. As shown in FIG. 9, the magnet temperature compensating unit 340 comprises an Id compensation table 342, an Iq compensation table 344 and a δ compensation table 346. In order to compensate the phase shift Δδ of d, q-axes due to temperature rise, the value δ0 (shown in FIG. 8) output from the δ table 330 is compensated by a compensating coefficient Kδ using the δ compensation table 346 of the magnet temperature compensating unit 340.

Figure 10:
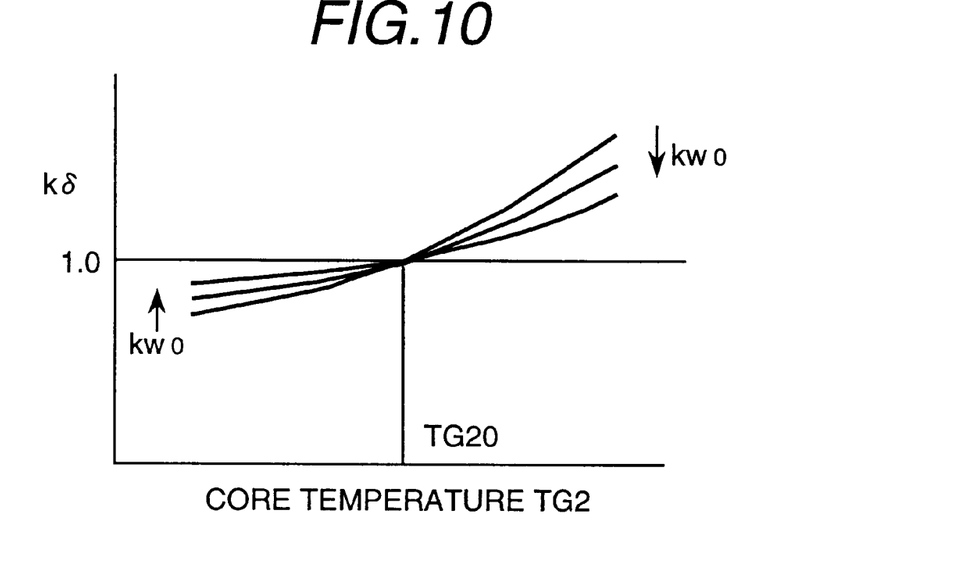
FIG. 10 is a graph showing the data for the δ table of phase difference angles of the magnet temperature compensation control means.

FIG. 10 shows the compensating coefficient Kδ. In FIG. 10, in a case where a core temperature assuming a magnet temperature is TG20, compensation of δ is not performed because of the compensating coefficient Kδ=1. However, in a case where a core temperature assuming a magnet temperature is above TG20, the phase shift is compensated by compensating the phase difference angle of FIG. 6 to δ+Δδ= Kδ×δ0 because of the compensating coefficient Kδ≈1.

As for the variation of output power, that is, decrease and increase in output power shown in FIG. 6 (indicated by a broken line), similar to the case of δ compensation, output characteristic not depending on the magnet temperature can be obtained by compensating the Id and Iq inside the generator due to decrease in the induced voltage using the Id compensation table 342 and the Iq compensation table 44 of the magnet temperature compensating unit 340, and compensating each of the outputs Id0 and Iq0 of the Iq table 324 and the Id table 326 using the compensation coefficients Kd and Kq.

Figure 11:
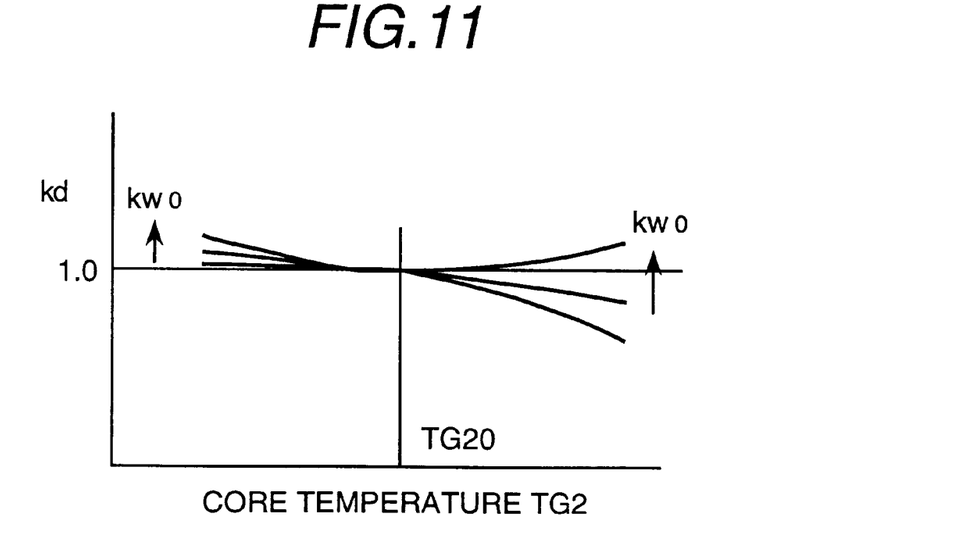
FIG. 11 is a graph showing the data for the Id table of the magnet temperature compensation control means.
Figure 12:
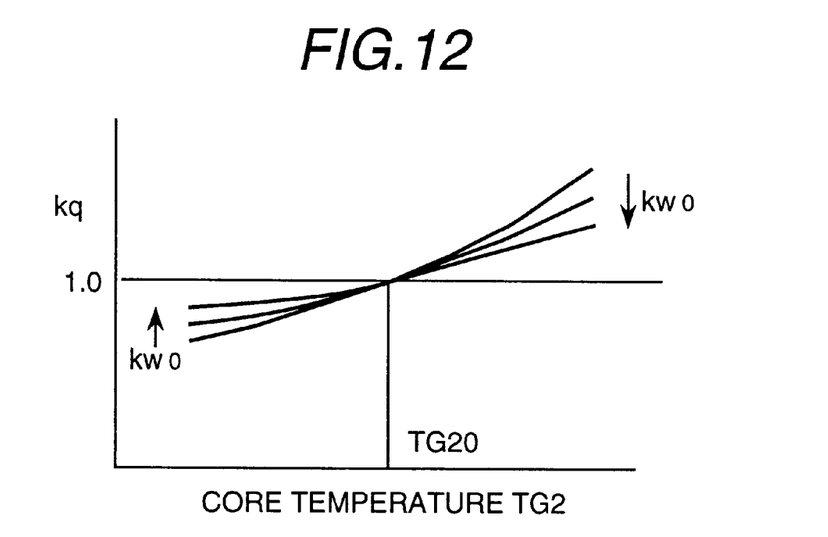
FIG. 12 is a graph showing the data for the Iq table of the magnet temperature compensation control means.

FIG. 11 and FIG. 12 show the data of Kd and Kq of the Id compensation table and the Iq compensation table, respectively.

Figure 13:
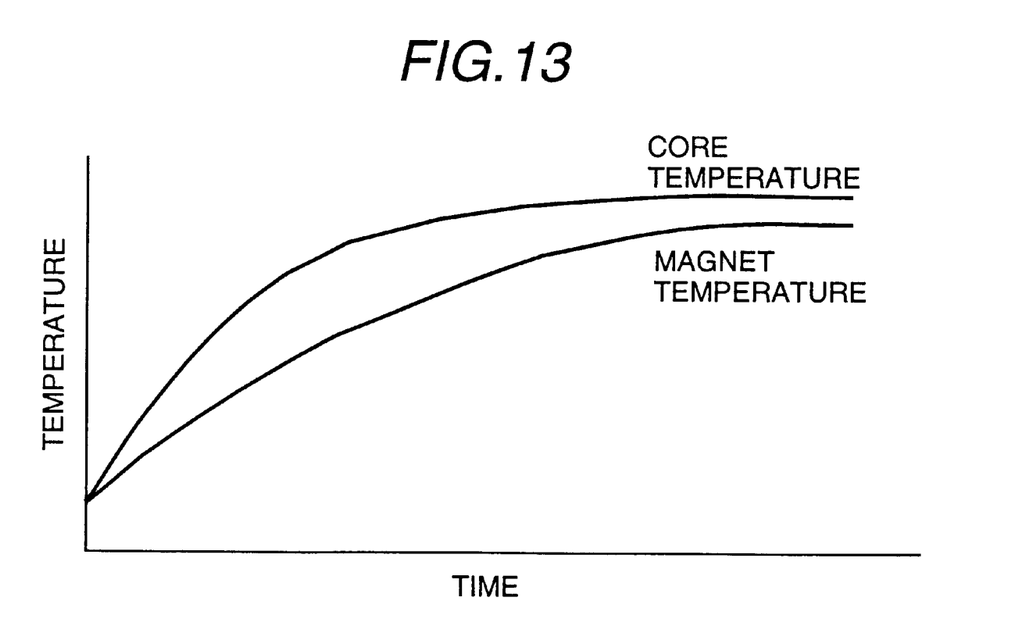
FIG. 13 is a graph showing the correlation between the magnet temperature and the core temperature.
Figure 14:
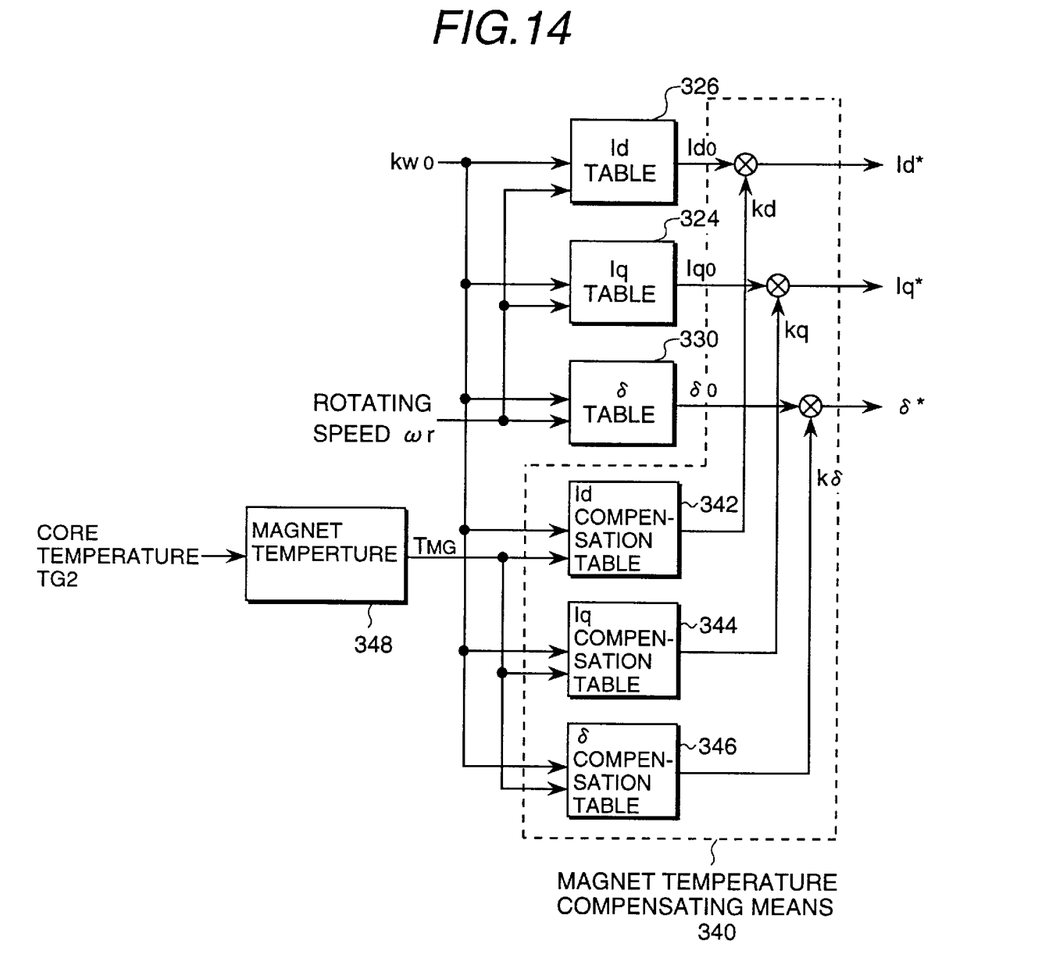
FIG. 14 is a detailed control block diagram of the magnet temperature compensation control means having a magnet temperature estimating means.
Figure 15:
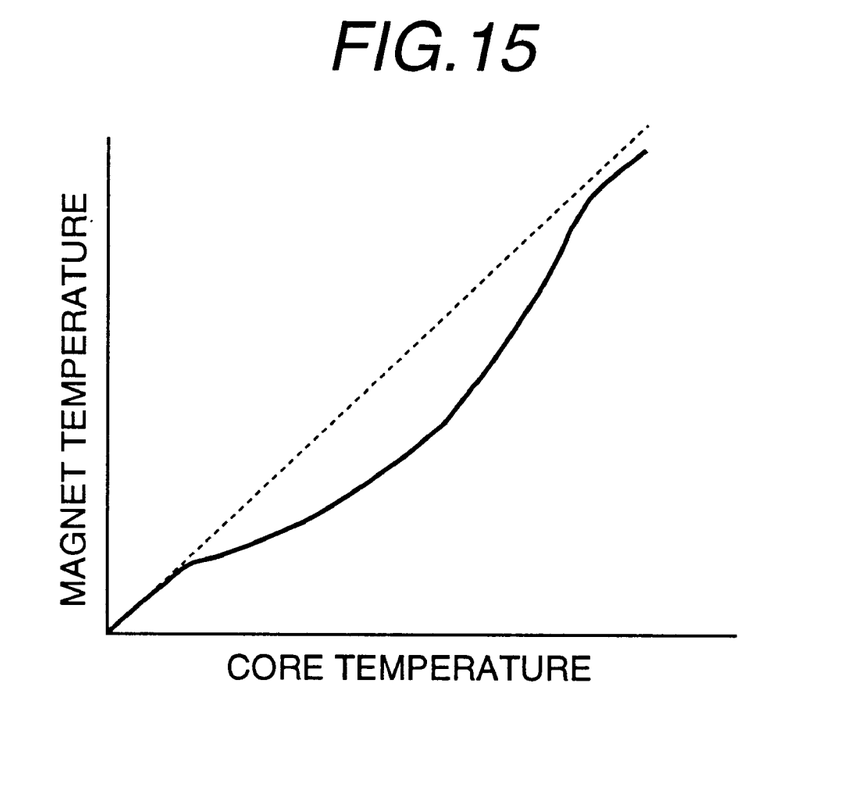
FIG. 15 is a graph showing an example of a magnet temperature estimating table as the magnet temperature estimating means.

Although the above description explains an embodiment in which the magnet temperature is estimated from the core temperature a temperature difference exists between the core temperature and the magnet temperature as shown in FIG. 13. Therefore, in order to estimate the magnet temperature as accurately as possible, it is preferable that a magnet temperature estimating unit 348 is provided in the magnet temperature compensating unit 340 as shown in FIG. 14. There is the correlation between the magnet temperature and the core temperature as shown in FIG. 13, and the magnet temperature is generally lower than the core temperature and has a larger thermal time constant. The magnet temperature estimating unit 348 comprises a magnet temperature estimation table for estimating a magnet temperature from a core temperature as shown in FIG. 15. The broken line indicate a target value and the solid line indicates an actual measured value. When the temperature is being increased, the difference of the magnet temperature to the core temperature becomes large and then is gradually settled to a certain temperature difference.

Figure 16:
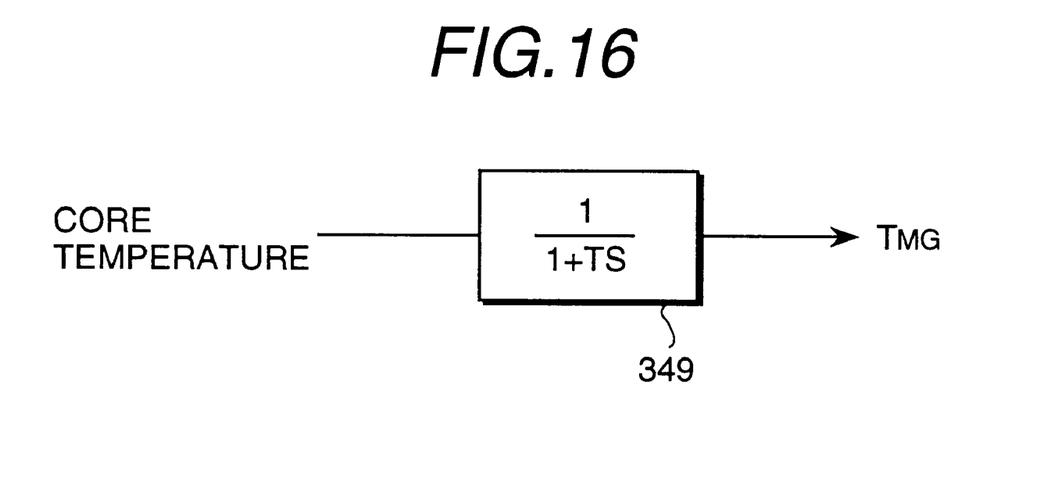
FIG. 16 is a diagram showing an example of a first-order time lag element equivalent to a thermal time constant for estimating the magnet temperature as the magnet temperature estimating means.

Further, instead of the magnet temperature estimating unit 348 of FIG. 14, a first-order time lag element magnet temperature estimating unit 349 having an equivalent thermal time constant estimating the magnet temperature may be employed, as shown in FIG. 16.

According to the present invention, in a driving control system of a permanent magnet synchronous machine, sensorless controlled without using any magnet pole position sensor or any angle sensor, variation of output power at a high magnet temperature can be compensated by performing compensating control of the phase difference angle δ and the current command values Id* and Iq* corresponding to the magnet temperature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving arrangement for a permanent magnet type synchronous machine system for propelling a vehicle, said machine system having a synchronous motor, a permanent magnet type generator and a battery as main electric power sources, and an electric power converter coupled to said generator and to said battery for providing electric power to drive said synchronous motor, said driving system comprising:

a current command generator for generating a d-axis current command and a q-axis current command for said synchronous machine system;

a d, q-axis current control unit for generating AC voltage command values Vu*, Vv* and Vw* based on the d, q-axis current commands and detected values of d, q-axis currents from said synchronous machine svstem;

a PWM control unit for generating driving signals for said electric power converter based on said AC voltage command values;

a phase generating unit for generating a phase signal from zero-cross point information of said AC voltage command values and a phase difference angle δ between induced voltage and terminal voltage of said synchronous machine; and a magnet temperature compensating unit for compensating said phase difference angle δ depending on magnet temperature rise of said permanent magnet type synchronous machines.

2. A driving arrangement for a permanent magnet type synchronous machine system according to claim 1, wherein said magnet temperature compensating unit comprises a phase difference angle δ compensating table for compensating a phase difference angle δ depending on a magnet temperature.

3. A driving arrangement for a permanent magnet type synchronous machine system according to claim 2, wherein said phase difference angle δ compensating table receives an output command of said synchronous machine system and a magnet temperature of said synchronous machine system as input signals, and outputs a compensating coefficient Kδ.

4. A driving system arrangement for a permanent magnet type synchronous machine system according to claim 1, wherein said magnet temperature compensating unit compensates current commands Id*, Iq* for the d, q-axis currents in addition to said phase difference angle δ based on said magnet temperature.

5. A driving arrangement for a permanent magnet type synchronous machine system according to claim 4, wherein said magnet temperature compensating unit comprises an Id compensating table and an Iq compensating table to compensate said d, q-axis current commands Id*, Iq*.

6. A driving arrangement for a permanent magnet type synchronous machine system according to claim 5, wherein said Id compensating table and said Iq compensating table receive an output command of said synchronous machine system and a magnet temperature of said synchronous machine system as input signals.

7. A driving arrangement for a permanent magnet type synchronous machine system according to claim 6, wherein a core temperature of said synchronous machine system is used as said magnet temperature.

8. A driving arrangement for a permanent magnet type synchronous machine system according to claim 1, wherein said magnet temperature compensating unit comprises a magnet temperature estimating unit for estimating a magnet temperature from a core temperature of said synchronous machine system.

9. A driving arrangement for a permanent magnet type synchronous machine system according to claim 8, wherein said magnet temperature estimating unit comprises a correlation table showing a relationship between the core temperature and the magnet temperature.

10. A driving arrangement for a permanent magnet type synchronous machine system according to claim 8, wherein said magnet temperature estimating unit comprises a first-order time lag element assuming a thermal time constant.

11. A driving arrangement for an electric vehicle comprising:

a permanent magnet type synchronous electric power generator for charging a battery, said permanent magnet type synchronous electric power generator being driven by a prime mover;

an AC motor for driving the vehicle, selectively using said generator and said battery as main electric power sources;

an electric power converter; and a driving controller for said generator and said motor; wherein said driving controller comprises a current command generator for generating a d-axis current command and a q-axis current command;

a d, q-axis current control unit for generating AC voltage command values Vu*, Vv* and Vw* based on the d, q-axis currents from said generator and said motor;

a PWM control unit for generating driving signals for said electric power converter based on said AC voltage command values;

a phase generating unit for generating a phase signal from zero-cross point information of said AC voltage command values and a phase difference angle δ between induced and terminal voltage of said synchronous generator; and a magnet temperature compensating unit for compensating said phase difference angle δ depending on magnet temperature rise of said permanent magnet type synchronous generator.

12. A driving control method for an electric vehicle comprising:

a synchronous electric power generator driven by an engine;

a battery;

a synchronous motor for driving the vehicle selectively using said generator and said battery as electric power sources; and driving control circuits for said generator and said motor, said driving control circuits including electric power converters respectively, the driving control method comprising the steps of:

generating AC voltage command values Vu*, Vv* and Vw* based on d, q-axis current commands and detected values of d, q-axis currents from said generator and said motor;

generating a phase signal from zero-cross point information of said AC voltage command values and a phase difference angle δ of a δ-table storing phase difference angles δ between induced voltage and terminal voltage of said synchronous generator; and compensating output variation of said permanent magnet type synchronous generator and motor by compensating said phase difference angle δ depending on magnet temperature rise of said permanent magnet type synchronous machines.

* * * * *